United States Patent Office
3,565,961
Patented Feb. 23, 1971

1

3,565,961
PROCESS FOR PRODUCING 5-(1'-ALKENYL)-2-NORBORNENE
Tsuneyuki Nagase and Fujio Masuko, Takatsuki, Japan, assignors to Sumitomo Chemical Company, Ltd., Higashi-ku, Osaka, Japan, a corporation of Japan
No Drawing. Filed May 6, 1970, Ser. No. 35,247
Claims priority, application Japan, May 15, 1969, 44/37,827
Int. Cl. C07c 5/24
U.S. Cl. 260—666                           7 Claims

ABSTRACT OF THE DISCLOSURE

A 5-(1'-alkenyl)-2-norbornene, suitable as one of the components of an ethylene-propylene-diene terpolymer, having the formula,

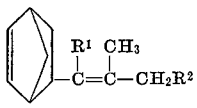

wherein $R^1$ and $R^2$ each are hydrogen atoms or linear alkyl groups, is adavntageously prepared by isomerizing in the presence of a catalyst a 5-(2'-alkenyl)-2-norbornene having the formula,

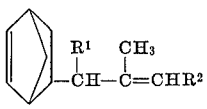

wherein $R^1$ and $R^2$ are same as above.

---

This invention relates to a novel process for producing a 5-(1'-alkenyl)-2-norbornene. More particularly, it relates to a novel process for producing a 5-(1'-alkenyl)-2-norbornene having the formula,

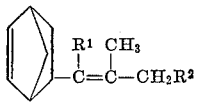

wherein $R^1$ and $R^2$ each are hydrogen atoms or linear alkyl groups having 1 to 6 carbon atoms.

A certain type of norbornene derivatives has been known useful as third monomer in ethylene-propylene-diene monomer (EPDM) rubber.

It is readily inferable that a 5-(1'-alkenyl)-2-norbornene may be prepared from cyclopentadiene and a proper conjugated 1,3-diene by Diels-Alder reaction. However, since a reaction between two reactive compounds of the conjugated diene as in the above case does not proceed with satisfactory selectivity, it is difficult to obtain the desired codimer of Diels-Alder reaction adduct in technical practice.

The object of the present invention is to provide a novel process for producing a 5-(1'-alkenyl)-2-norbornene.

According to the present invention a 5-(1'-alkenyl)-2-norbornene may be produced by carbon-carbon double bond isomerization, in the presence of a catalyst, of a 5-(2'-alkenyl)-2-norbornene having the formula,

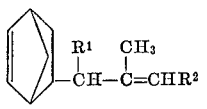

wherein $R^1$ and $R^2$ each represent the same as in Formula I.

2

As the catalyst for this isomerization, the following compounds may be used:
(1) An acid which will not oxidize the double bond, and
(2) A Lewis acid such as a metal halide of the Friedel-Crafts type.

The starting material, 5-(2'-alkenyl)-2-norbornene, can be obtained by Diels-Alder reaction from cyclopentadiene or dicyclopentadiene and a non-conjugated 1,4-diene having the formula,

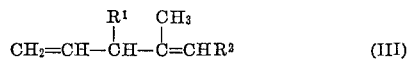

wherein $R^1$ and $R^2$ each represent the same as in Formula I.

Alternatively, 5-(2'-alkenyl)-2-norbornene can also be obtained by the dehydration of a 5-(2'-hydroxyalkyl)-2-norbornene having the formula,

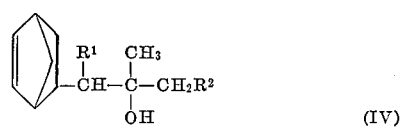

wherein $R^1$ and $R^2$ each represent the same as in Formula I, or of a 5-(3'-hydroxyalkyl)-2-norbornene. In the case of 5-(2'-hydroxyalkyl)-2-norbornene, there is obtained by the dehydration a mixture of 5-(1'-alkenyl)- or 5-(2'-alkenyl)-2-norbornene. The mixture can be used as the starting material for the isomerization without isolating the 5-(2'-alkenyl)-2-norbornene.

As the catalyst for isomerization there is used an acid or a Lewis acid which will neither oxidize nor add to the double bond of 5-(2'-alkenyl)-2-norbornene and which will not promote the polymerization of the same. Examples of the catalyst include, p-toluenesulfonic acid, phosphoric acid, boron trifluoride, aluminium chloride, zinc chloride, titanium tetrachloride, ferric chloride, boron trichloride, aluminum bromide, tin chloride, antimony pentachloride, etc.

The catalyst concentration may vary from about 0.001 mole to about 3.0 moles, preferably from about 0.005 mole to about 0.5 mole per mole of 5-(2'-alkenyl)-2-norbornene.

When the catalyst concentration falls below 0.005 mole, the isomerization proceeds too slowly. When a catalyst concentration greater than 0.5 mole is used, the reaction temperature should be lowered. The reaction temperature may range from about 0° to about 200° C., preferably from about 20° to about 140° C. For example, when p-toluenesulfonic acid is used as the catalyst, the reaction proceeds even at room temperature. However, when chloroform is used as a solvent, the reaction readily proceeds at the reflux temperature, the boiling point of chloroform.

The isomerization time, when can be determined by gas-chromatographic analysis, can vary from about 1 hour to about 100 hours, preferably from about 2 hours to 24 hours. The isomerization is carried out under atmospheric pressure, and frequently and conveniently in an atmosphere of inert gas.

No solvent is needed. However, when a solvent is used in the isomerization, the concentration of 5-(2'-alkenyl)-2-norbornene may vary within a wide range.

The following examples illustrate the present invention but should not be construed as limiting the scope of the invention.

EXAMPLE 1

In a 100 ml. round-bottomed flask were placed 6.90 g. of 5-(2'-methallyl)-2-norbornene, 20 ml. of chloroform and 0.512 g. of p-toluenesulfonic acid. The mixture was heated under reflux for 8 hours. Then the chloroform was removed by distillation and the residue was distilled in a vacuum to give 6.7 g. of diene containing 73.3% of 5-(2'-methyl-1'-propenyl)-2-norbornene and 26.7% of starting material, B.P. 78° C./19.5 mm. Hg, $n_D^{19.0}$ 1.4880.

EXAMPLE 2

In a three-necked flask equipped with a stirrer and a reflux condenser were placed 21.60 g. of 5-(2'-methallyl)-2-norbornene, 30 ml. of anhydrous benzene and 1.206 g. of p-toluenesulfonic acid. The mixture was heated under reflux with stirring for 8 hours. Then the benzene was distilled off and the residue was distilled in a vacuum to give 17.7 g. of diene containing 77.6% of 5-(2'-methyl-1'-propenyl)-2-norbornene and 22.4% of starting material, B.P. 82–84° C./26 mm. Hg.

EXAMPLE 3

In a 100 ml. round-bottomed flask were placed 6.90 g. of 5-(2'-methallyl)-2-norbornene, 20 ml. of benzene and 0.4 g. of anhydrous aluminum chloride. The mixture was heated under reflux for 8 hours. Then the benzene was distilled off and the residue was distilled in a vacuum to give 6.7 g. of diene. Diene was found by vapor phase chromatographic analysis to be mixture consisting of 48% of 5-(2'-methyl-1'-propenyl)-2-norbornene and 52% of starting material.

EXAMPLE 4

In a 200 ml. round-bottomed flask were placed 6.90 g. of 5-(2'-methallyl)-2-norbornene, 20 ml. of benzene and 0.5 g. of anhydrous zinc chloride. The mixture was heated under reflux for 8 hours. Diene was found by vapor phase chromatographic analysis to be a mixture consisting of 53% of 5-(2'-methyl-1'-propenyl)-2-norbornene and 47% of starting material.

EXAMPLE 5

In a 100 ml. round-bottomed flask were placed 6.01 g. of 5-(2'-methallyl)-2-norbornene, 20 ml. of chloroform and 0.41 g. of p-toluenesulfonic acid. The mixture was heated under reflux for 4 hours. After removal of chloroform, 5.66 g. of an oily substance boiling at 80–85° C./26 mm. Hg was obtained.

To 20 ml. of chloroform solution of its oily substance 0.285 g. of p-toluenesulfonic acid was added and the mixture was heated under reflux for 4 hours. The chloroform was distilled off and the residue was found by vapor phase chromatographic analysis to be a mixture consisting of 81.21% of 5-(2'-methyl-1'-propenyl)-2-norbornene and 18.79% of starting material.

What is claimed is:
1. A process for producing a 5-(1'-alkenyl)-2-norbornene having the formula,

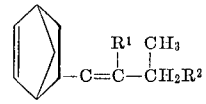

wherein $R^1$ and $R^2$ each are hydrogen atoms or linear alkyl groups, which comprises isomerizing a 5-(2'-alkenyl)-2-norbornene having the formula,

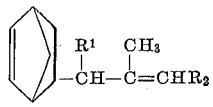

wherein $R^1$ and $R^2$ each represent the same as above-mentioned, with a catalyst comprising an acid which will not oxidize the double bond, or a Lewis acid selected from metal halides of the Friedel-Crafts type.

2. A process according to claim 1, wherein the acid used as a catalyst which will not oxidize the double bond, is p-toluenesulfonic acid or phosphoric acid.

3. A process according to claim 1, wherein the Lewis acid used as a catalyst, which is selected from metal halides of the Friedel-Crafts type, is boron trifluoride, aluminum chloride, zinc chloride, titanium tetrachloride, ferric chloride, boron trichloride, aluminum bromide, tin chloride, or antimony pentachloride.

4. A process according to claim 1, wherein the catalyst is used in a range of from about 0.001 mole to about 3.0 moles per mole of 5-(2'-alkenyl)-2-norbornene.

5. A process according to claim 1, wherein the isomerization is effected at a temperature of from about 0° to about 200° C.

6. A process according to claim 1, wherein the isomerization is effected in the presence of a solvent.

7. A process according to claim 1, wherein the linear alkyl groups have 1 to 6 carbon atoms.

References Cited
UNITED STATES PATENTS 3,151,173　9/1964　Nyce _____ 260—666
3,252,957　5/1966　Pledger _____ 260—666

DELBERT E. GANTZ, Primary Examiner

V. O'KEEFE, Assistant Examiner